US008784946B2

(12) United States Patent
Fowler et al.

(10) Patent No.: US 8,784,946 B2
(45) **Date of Patent: *Jul. 22, 2014**

(54) CONTINUOUS MANUFACTURING PROCESS FOR COATED-CORE CLEANER BLADES

(75) Inventors: Jeffrey M. Fowler, Rochester, NY (US); Steven C. Hart, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 1187 days.

This patent is subject to a terminal disclaimer.

(21) Appl. No.: 12/241,863

(22) Filed: Sep. 30, 2008

(65) Prior Publication Data

US 2010/0080927 A1 Apr. 1, 2010

(51) Int. Cl.
*C08J 7/04* (2006.01)
*G03G 21/00* (2006.01)

(52) U.S. Cl.
USPC ........ 427/512; 427/372.2; 427/375; 427/424; 427/427.2; 427/434.2; 399/350; 399/343

(58) Field of Classification Search
USPC ........... 427/512, 508, 293, 372.2, 375, 434.2, 427/427.2
See application file for complete search history.

(56) References Cited

U.S. PATENT DOCUMENTS

| | | | | |
|---|---|---|---|---|
| 3,848,993 A * | 11/1974 | Hasiotis | 399/351 |
| 3,936,183 A * | 2/1976 | Sadamatsu | 399/350 |
| 4,332,836 A * | 6/1982 | Urban | 427/496 |
| 4,970,560 A * | 11/1990 | Lindblad et al. | 399/350 |
| 4,984,326 A | 1/1991 | Horie et al. | |
| 5,778,284 A | 7/1998 | Kumar et al. | |
| 5,888,436 A | 3/1999 | Keith et al. | |
| 6,032,004 A | 2/2000 | Mirabella, Jr. et al. | |
| 6,136,380 A * | 10/2000 | Suzuki et al. | 427/434.2 |
| 6,363,237 B1 | 3/2002 | Nagame et al. | |
| 6,453,146 B1 | 9/2002 | Yamada et al. | |
| 6,547,369 B1 | 4/2003 | Temple | |
| 6,592,796 B2 | 7/2003 | Hill et al. | |
| 6,633,739 B2 * | 10/2003 | White et al. | 399/353 |
| 2004/0265024 A1 | 12/2004 | Naruse et al. | |
| 2005/0019588 A1 * | 1/2005 | Berry et al. | 428/424.8 |
| 2006/0216526 A1 | 9/2006 | Tomiyama et al. | |
| 2007/0144664 A1 * | 6/2007 | Winter et al. | 156/265 |
| 2008/0027184 A1 | 1/2008 | Ueno et al. | |

FOREIGN PATENT DOCUMENTS

| | | |
|---|---|---|
| JP | 04-240887 | 8/1992 |
| JP | 08-146809 | 7/1996 |

OTHER PUBLICATIONS

Notice of Allowance dated Aug. 31, 2011, U.S. Appl. No. 12/241,885, pp. 1-7.
Office Action Communication, Jeffrey Fowler et al., U.S. Appl. No. 12/241,885, dated Jan. 10, 2011, pp. 1-10.
Office Action Communication, Jeffrey Fowler et al., U.S. Appl. No. 12/241,885, dated Jun. 14, 2011, pp. 1-8.

* cited by examiner

*Primary Examiner* — Irina Krylova
(74) *Attorney, Agent, or Firm* — Gibb & Riley, LLC

(57) ABSTRACT

A method feeds a continuous core of a print cartridge cleaning blade along a path. The path passes, in the following order, firstly through a coating bath or spray coating station, secondly by a curing station, thirdly through a cutter, and fourthly to a finisher station. Thus, the method herein coats portions of the continuous core that are in the coating bath/spray station with an outer covering. For portions of the continuous core that are adjacent the curing station, the method cures the outer covering of the continuous core; for portions of the continuous core that are in the cutter, the method cuts the continuous core into predetermined lengths; and for portions of the predetermined lengths of the continuous core that are adjacent the finishing station, the method finishes the outer covering of the predetermined lengths of the continuous core to produce a finished print cartridge cleaning blade.

9 Claims, 7 Drawing Sheets

CONTINUOUS MANUFACTURING PROCESS FOR COATED-CORE CLEANER BLADES

CROSS-REFERENCE TO RELATED APPLICATIONS

This application is related to U.S. patent application Ser. No. 12/241,885, entitled "Coated-Core Cleaner Blades", by Jeffrey M. Fowler et al., filed Sep. 30, 2008, issued as U.S. Pat. No. 8,068,779 on Nov. 29, 2011, the complete disclosure of which, in its entirety, is herein incorporated by reference.

BACKGROUND AND SUMMARY

Embodiments herein generally relate to a method for manufacturing a print cartridge cleaning blade, and more particularly, concerns a method of using a continuous core to create a print cartridge cleaning blade.

Therefore, the embodiments herein present a method that feeds a continuous core of a print cartridge cleaning blade along a path. The path passes, in the following order, firstly through a coating bath or spray coating station, secondly by a curing station, thirdly through a cutter, and fourthly to a finisher station. In one example, the continuous core can be fed between the different manufacturing stations along guides.

Thus, the methods herein first coat portions of the continuous core that are in the coating bath/spray station with an outer covering. For example, the core can be supplied to the coating bath from a spool of core material. When performing such bath coating, the methods herein can apply an electrical charge to the coating bath and the continuous core.

For portions of the continuous core that are adjacent the curing station, the method cures the outer covering of the continuous core. The curing process can comprise, for example, evaporating moisture and solvents from the coating, applying heat to the coating, and/or applying ultra-violet light to the coating.

Similarly, for portions of the continuous core that are in the cutter, the method cuts the continuous core into predetermined lengths; and for portions of the predetermined lengths of the continuous core that are adjacent the finishing station, the method finishes the outer covering of the predetermined lengths of the continuous core to produce a finished print cartridge cleaning blade.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
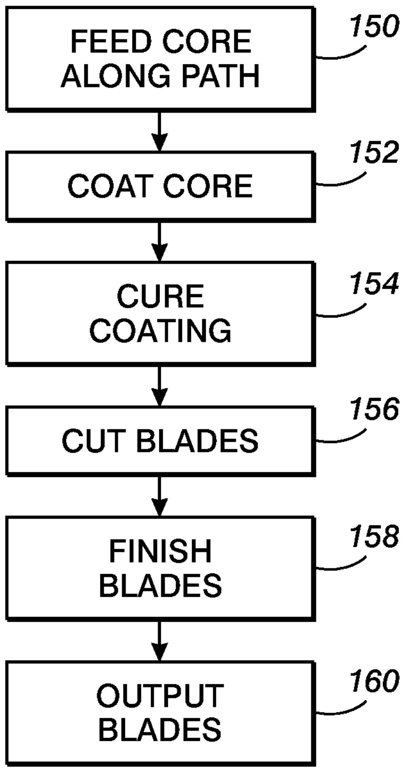
FIG. 1 is a flowchart illustrating a method embodiment herein.

As mentioned above, coated-core print cartridge cleaner blades have not been mass produced previously. Therefore, the disclosed manufacturing process captures the cost savings and process control advantages that continuous manufacturing offers over batch manufacturing As shown in flowchart form in FIG. 1, the embodiments herein present a method that feeds a continuous core of a print cartridge cleaning blade along a path in item 150. The path passes first through a coating bath or spray coating station that coats the core, as shown in item 152. Next, as shown in item 154, secondly the method passes the coated core by a curing station to cure the coating. Thirdly, as shown in item 156, the method passes the cured, coated core through a cutter, which cuts the coated core into blade-length segments. In item 158, the method passes the blade-length segments to a finisher station. After the blade-length segments are finished, they are output in item 160.

Figure 2:
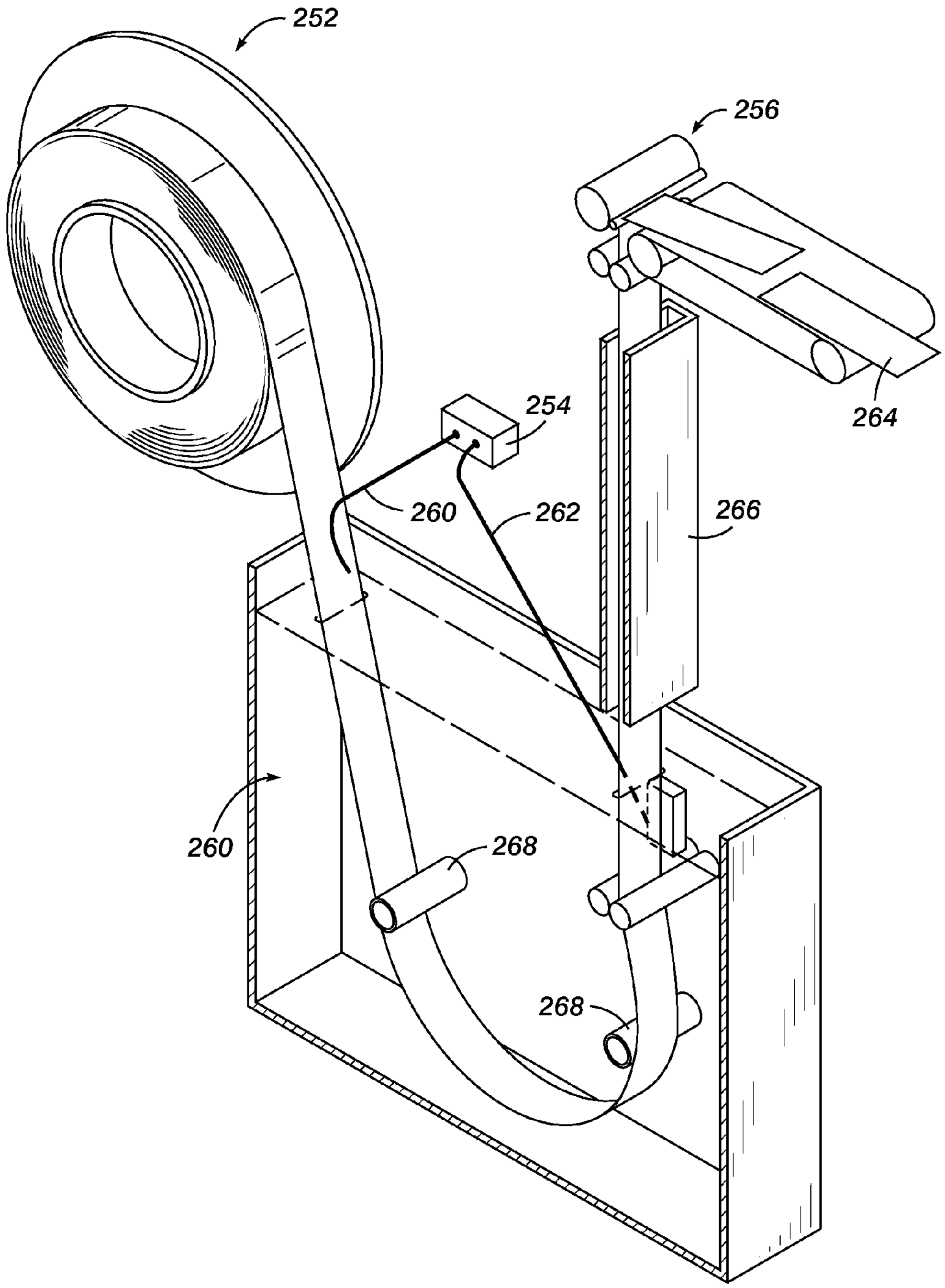
FIG. 2 is a schematic diagram of a manufacturing system according to embodiments herein.
Figure 3:
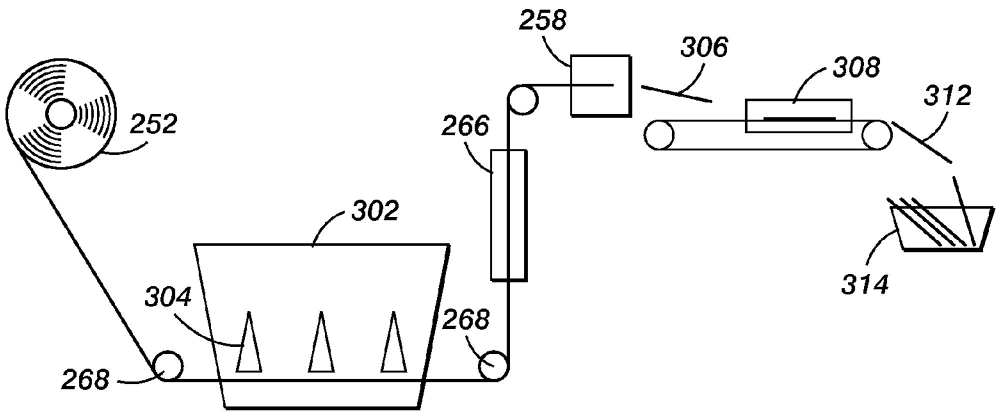
FIG. 3 is a schematic diagram of a manufacturing system according to embodiments herein.
Figure 4:
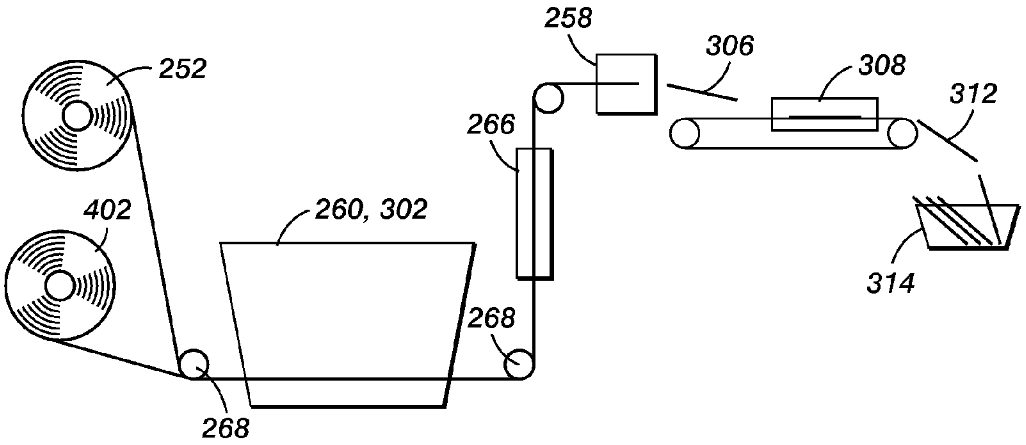
FIG. 4 is a schematic diagram of a manufacturing system according to embodiments herein.

While FIG. 1 illustrates the methods herein conceptually through the use of a flowchart, FIGS. 2-4 illustrate different examples of manufacturing systems that can be used with embodiments herein. For example, as shown in FIG. 2, item 252 represents a stock roll of core material. This core material 252 can comprise any material having sufficient rigidity and durability to be utilized as the core of a cleaning blade. For example, the core material could comprise any of the materials mentioned in the commonly owned U.S. Pat. No. 8,068,779 mentioned above, which is incorporated herein by reference. Thus, the core material on the stock roll 252 could comprise a plastic, a ceramic, a metal, an alloy, or any other similar material. The continuous core 252 can be fed between the different manufacturing stations along guides 268.

The methods herein first coat portions of the continuous core using a coating bath 260. The coating bath 260 leaves an outer covering on the core. When performing bath coating, the methods herein can apply an electrical charge (if electrophoretic (EP) processing is utilized) that is generated by a power supply 252 and transferred to the coating bath 260 and/or core material 252 through electrical contacts 260 and 262 to the coating bath and the continuous core. There are many well-known coating processes that use coating baths and electrophoretic coating (for example see U.S. Pat. No. 5,888,436, the complete disclosure of which is incorporated herein by reference) and the details of such well-known processes are not discussed herein for the sake of brevity. Similarly, the coating materials utilized can vary depending upon the design of the cleaning blade. For example, the coating material could comprise any of the materials mentioned in U.S. Patent Publication Number 2008/0027184 and U.S. Pat. Nos. 6,547,369 and 6,453,146, the complete disclosures of which are incorporated herein by reference. Similarly, the coating, material could comprise any of the materials mentioned above in commonly owned U.S. Pat. No. 8,068,779. Thus, the coating material could comprise rubber, nylon, polymer, etc.

Item 266 illustrates a curing station 266 which can comprise a heater for applying heat to the coating and evaporating moisture and solvents from the coating and/or a ultra-violet (UV) light source for applying ultra-violet light to the coating. Thus, the portions of the continuous core that are adjacent the curing station 266, are cured. Item 256 represents an automated cutter. Portions of the continuous core that are in the cutter 256 are cut into predetermined lengths.

FIG. 3 illustrates another embodiment that is similar to the embodiment shown in FIG. 2, and the same identification numerals are used to identify the same features in both drawings. However, FIG. 3 illustrates a spray coating station 302 that is used in place of the coating bath 260. As shown in FIG. 3, the spray coating station 302 can include multiple spray heads 304.

Further, FIG. 3 also illustrates a finishing station 308. The predetermined lengths of the continuous core 306 that have been cut and supplied to the finishing station are finished (cut, shaped, sanded, polished, etc.) to produce a finished print cartridge cleaning blades 312 that can be maintained within a storage location or transportation container 314. In another example, shown in FIG. 4, multiple cores 252, 402 (e.g., at least two) can simultaneously feed multiple continuous cores along parallel (or substantially similar) paths to increase productivity.

The coating by the bath/spray station controls the thickness of outer covering by adjusting chemical concentrations and exposure times. Similarly, the curing process controls the thickness of the outer covering by adjusting power levels and exposure times. Also, the finishing station controls the thickness of the outer covering by varying the shaping and polishing processes.

Thus, as shown above, stock for the core, with the appropriate cross section and edge properties, is pulled through the coating bath or spray-coating area. If electrophoretic deposition is employed, an electric potential is applied between the stock and a counter-electrode. If required by the material, the coating is cured (e.g. by evaporation, thermal, or UV illumination) as it exits the bath. The blade is then cut to length and any additional geometry is imposed (e.g. by a rolling die). The radius of the cleaning edges is controlled according to the application process used. Additional returns to scale may be realized by running multiple rolls of stock in parallel and sharing the bath, drive shafts, idle shafts, power supplies, curing apparatus, and material handling apparatus as appropriate. Blades manufactured in the continuous process achieve better inboard-to-outboard uniformity than blades manufactured in a batch dipping process.

Note that while the use of coating baths, curing stations, cutting stations, finishing stations, etc. has been introduced previously (for example, see U.S. Pat. No. 5,888,436, mentioned above) the present embodiments are distinct from such teachings because contrary to a more general continuous manufacturing method, more properties of the coating are subject to direct control. These properties, e.g. coating thickness and corner radius, are critical to the functionality of the finished product. They may be controlled through such parameters as the viscosity of the bath solution, the rate at which stock is pulled from the bath, the surface tension of the bath solution, the adhesion between the core and the bath solution, and (if electrophoretic (EP) processing is utilized) the electrode geometry. The present embodiments are substantially distinct from batch dip coating in that the stock must be pulled vertically from the bath and that the continuous process generates a uniform coating along the length of a blade while maintaining a constant pull rate.

Figure 5:
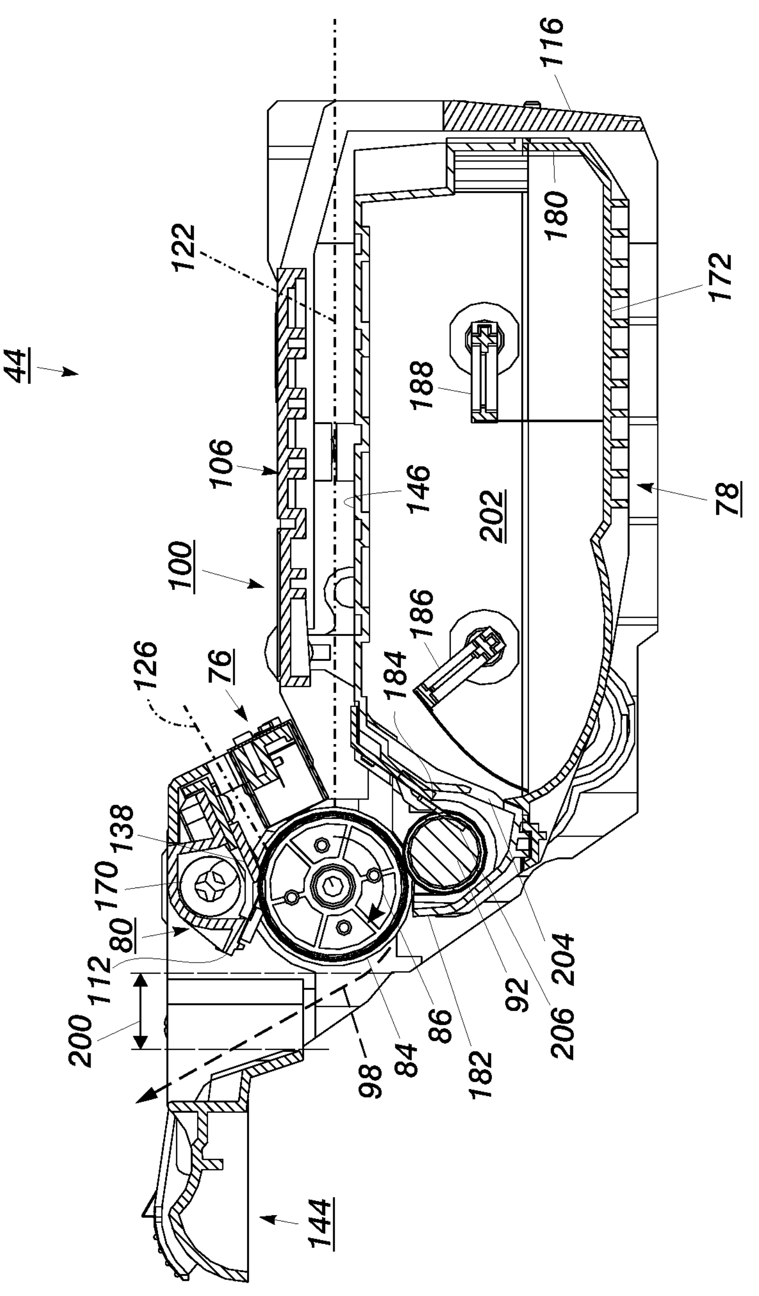
FIG. 5 is a schematic diagram of a print cartridge having a cleaning blade.
Figure 6:
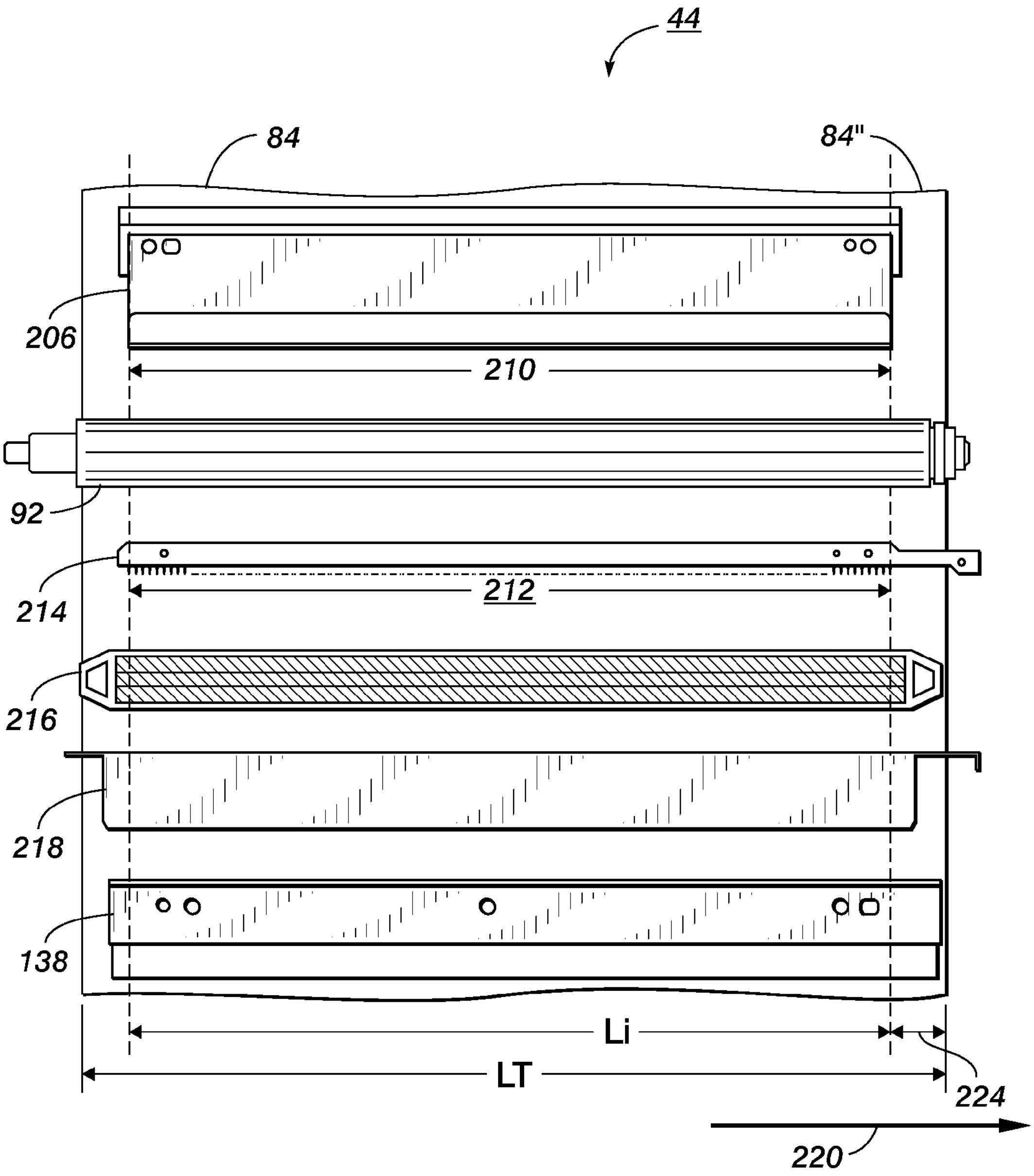
FIG. 6 is a schematic diagram of a print cartridge having a cleaning blade.
Figure 7:
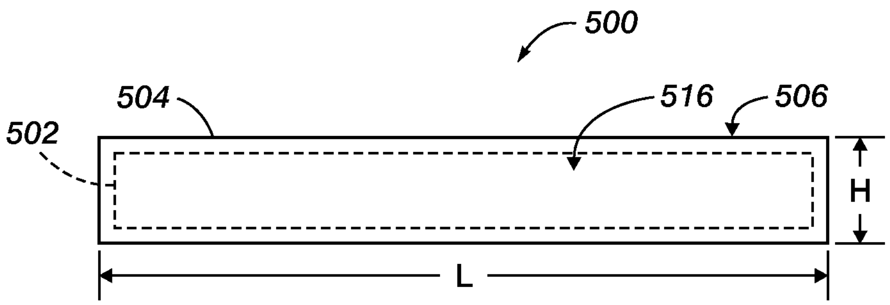
FIG. 7 is a schematic diagram of a core-coated cleaner blade according to embodiments herein.
Figure 8:
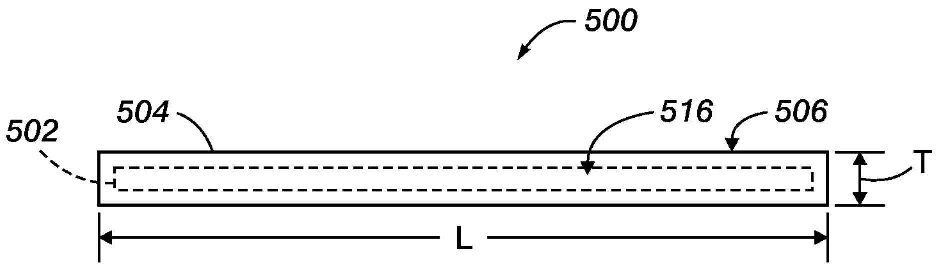
FIG. 8 is a schematic diagram of a core-coated cleaner blade according to embodiments herein.

The coated-core cleaning blades 500 can be used in many different devices. For example, FIGS. 5 and 6 illustrate the use of a cleaning blade 138 within a cartridge module. Referring specifically to FIG. 5, a vertical (front-to-back) section of the process cartridge module 44 is illustrated that is similar to the cartridge module shown in U.S. Pat. No. 5,778,284, the complete disclosure of which is incorporated herein by reference. As shown in FIG. 5, the developer subassembly 78 is mounted within the trough region of the module housing subassembly 72 as defined in part by the front end wall 116, the second side wall, and the top wall 106 of the module housing subassembly. The module handle 144 as attached to mounting members forms a portion of the sheet or paper path 98 of the machine by being spaced a distance 200 from photoreceptor 84 in the raised rear end 112 of the module housing 100. The photoreceptor or drum 84 is mounted to the side walls 102, 104, (only one of which is visible), and as shown is located within the raised rear end 112 and is rotatable in the direction of the arrow 86. The charging subassembly 76 is mounted within the second cutout in the top wall 106 and includes the slit defining part of the second light path 126 for erase light to pass to the photoreceptor 84. Upstream of the charging subassembly 76, the cleaning subassembly 80, including the cleaning blade 138 and the waste toner removing auger 170, is mounted within the raised rear end 112, and into cleaning contact with the photoreceptor 84. As further shown, the top wall 106 of the module housing 100 is spaced from the top 146 of the developer subassembly 78, thus defining the part of first light path 122 for the exposure light. The first light path 122 is located so as to be incident onto the photoreceptor at a point downstream of the charging subassembly 76.

The front 180, top 146, rear end 182, and bottom member 172 of the developer subassembly define a chamber 202, having an opening 204, for containing developer material (not shown). The first and second agitators 186, 188 are shown within the chamber 202 for mixing and moving developer material towards the opening 204. The developer material biasing device 184 and a charge trim and metering blade 206 are mounted at the opening 204. As also shown, the magnetic developer roll 92 is mounted at the opening 204 for receiving charged and metered developer material from such opening, and for transporting such developer material into a development relationship with the photoreceptor 84.

In an all-in-one, discharged area development (DAD) electrostatographic process cartridge, it has been found that in order to have consistent high quality toner image development and transfer, the included electrostatographic process components must have critical acting regions relative to an imaging region on the photoreceptor, and relative to one another. Referring now to FIG. 6, the ordinarily cylindrical or drum photoreceptor or photoreceptive member 84 of the process cartridge 44 is illustrated as a split plane 84" having an overall axial length LT and an imaging length Li for short edge fed substrates or sheets. For optimal image quality reasons in a DAD process, it has been found that an acting region 210 of the charge metering blade 206 (see also FIG. 5) for charging and metering toner for development, should be centered to, and precisely only as long as the imaging length Li of the photoreceptor 84 as shown. The same is true also of the acting region 212 of the pin-array charge emitting device 214 of the charging subassembly 76 (FIG. 5) in order to avoid the occurrence of "dark bands" towards the edges of a formed and transferred image.

On the other hand, the acting regions of the developer roll 92, as well as those of a grid member 216 and of a shield member 218 both also of the charging subassembly 76, can extend slightly to either end beyond the imaging length Li, as shown. Importantly, in accordance with one aspect of the present invention, where the direction of waste toner flow is indicated by the arrow 220, the cleaning blade 138 of the cleaning subassembly 80 is not centered, but is offset as shown by a distance 224 relative to the imaging length Li, and in the direction of waste toner flow 220. The acting region of the detack device although not shown on FIG. 6, is advantageously made precisely equal to that of the pin-array charge emitting device 212 in order to avoid recharging the areas of the photoreceptor outside the imaging length Li, thus causing subsequent toner contamination.

The finalized blades are shown in FIGS. 7-10. More specifically, as shown in FIGS. 7-10, the embodiments herein provide a coated-core cleaner blade 500. The coated-core cleaner blade according to embodiments herein has a core 502 comprising a first material and a coating 504 surrounding the core 502. The coating 504 comprises a second material that is different than the first material.

The core 502 (first material) is substantially rigid compared to the coating 504 (second material). Therefore, the first material is said to have a first flexibility that is much less than a second flexibility of the second material. For example, the elastic modulus of the core 502 can be at least five times that of the coating 504, and can be tens or hundreds times the modulus of the coating 504, depending upon the specific application.

For example, the core 502 can comprise a plastic, a ceramic, a metal, and/or an alloy, etc. To the contrary, the coating 504 can comprise a plastic, a rubber, and/or a polymer, etc. (e.g., urethane and polycarbonate, etc.). The core 502 material, potentially a metal (such as stainless steel), plastic, or other appropriate candidate, can be chosen by the designer to achieve a specific beam stiffness, depending upon the specific environment in which the cleaner blade 500 will be used.

The core 502 has a rectangular shape. Thus, the core 502 has a length (L), a height (H) perpendicular to the length, and a thickness (T) perpendicular to the length and the height. Because it is an elongated rectangle, the length is greater in size than the thickness and the height; and the height is also greater in size than the thickness. Thus, the rectangular shape has a top, a bottom, sides, and ends. The top and bottom are rectangular planes defined by the thickness and the length. The sides are rectangular planes defined by the height and the length. The ends are rectangular planes defined by the height and the thickness.

The square corners 516 of the core 502 below the blade edges 506 are located where the sides of the rectangular shape meet the top and the bottom, and the square corners 516 run from one end to the opposite end. The core 502 has "sharp" square edges (for example, the edge radius could be on the order of as small as 1 to 3 microns (or larger or smaller) depending upon material selection and designer specifications). For example, the core could be a stainless steel material manufactured with tightly controlled dimensions and with "square" edges (much in the fashion of producing razor blades).

Figure 9:
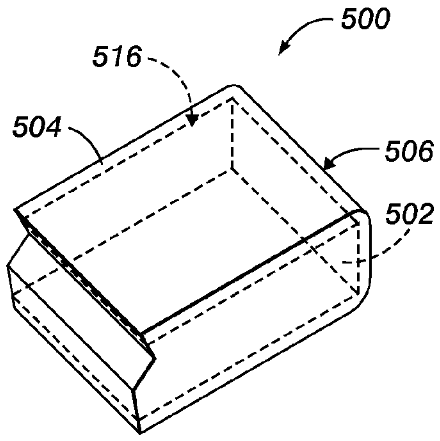
FIG. 9 is a schematic diagram of a core-coated cleaner blade according to embodiments herein.

Such sharp square corners 516 allow the coating material 504 to also have corresponding sharp corners 506, as illustrated in FIG. 9. These corners are the blade edges 506 which contact the surfaces of the belt or drum being cleaned. The coated-core cleaner blades 500 disclosed herein have very precisely designable cleaning blade edges 506 because of the sharpness of the underlying corners 516 of the core 502. A cleaning blade edge of an appropriate material and radius will provide optimal cleaning performance and/or durability. The best choices of material and cleaning blade edge geometry will depend on the design of the photoreceptor, toner, and other system parameters.

Because the rigidness of the cleaner blade 500 is supplied solely by the core 502, the coating 504 material can be chosen based solely on durability and cleaning effectiveness. Further, the coating material can be quite thin (e.g., 5 microns, 10 microns, 15 microns, 25 microns etc.). Thus, the coating 504 can be much more compliant than bulk material of conventional cleaner blades, which must compromise on other material properties because of the need to apply pressure against the photoreceptor.

Thus, the blade edges 506 of the coated-core cleaner blade 500 have a very precise square edge 506 because the outer covering 504 may be applied with a range of shapes overlying the very square corners 516 of the core 502. This allows the cleaner blade 500 to provide increased cleaning performance and/or durability when compared to conventional cleaner blades. Further, the rigid core 502 prevents the cleaner blade 500 from acquiring a set or permanent bend. Therefore, the coated-core cleaner blade 500 will perform better and more consistently than conventional cleaning blades that can relax the force applied against the photoreceptor over time.

In addition, the core 502 allows the cleaner blade 500 to have up to four blade edges 506. More specifically, the rigid core 502 allows the outer covering 504 to be applied evenly on all surfaces, avoiding the distinction between the "outside" (air side) or marked "inside" that occurs with conventional cleaner blades. Because the cleaner blade 500 has four blade edges 506, this permits the cleaner blade 500 to be flipped and/or rotated to utilize a new blade edge, rather than being replaced. Therefore, this shape allows much greater service life when compared to conventional cleaner blades that only have a single edge.

Figure 10:
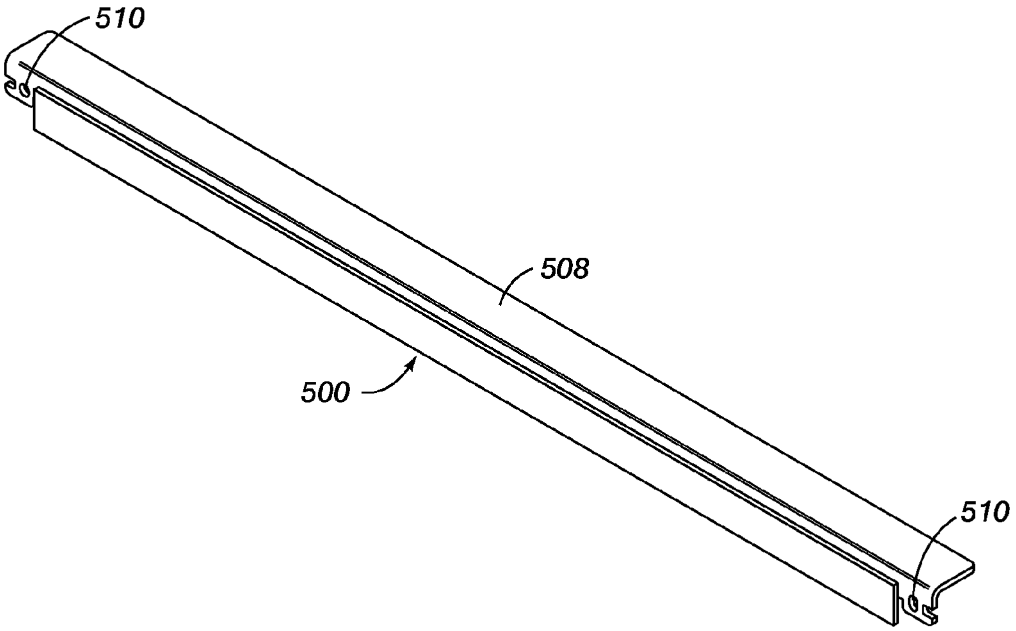
FIG. 10 is a schematic diagram of a core-coated cleaner blade according to embodiments herein.

The cleaner blade 500 can be mounted on the same casing/frame that supports the drum or belt using a mounting bracket (508 in FIG. 10) connected to the cleaner blade 500. The mounting bracket can include mounting slots, holes, pins, etc. which are illustrated in FIG. 10 as items 510. For example, the blade 500 can be mounted onto the bracket 508 with any appropriate amount (e.g., 8-12 mm) of extension (overhang). This bracket 508 is then used to locate the blade edge 506 (FIG. 9) with respect to the photoreceptor and to apply the necessary force.

Thus, as discussed above, the embodiments herein provide a cleaning blade 500 having a thin (e.g., 5 micron, 10 micron, 15 micron, 25 micron etc.), coating 504 that is applied to a thin, stiff "sharp" square edged core 502. This structure separates the functional requirements for the cleaning blade to be compliant and flexible, from those necessary for providing the blade load on the photoreceptor. Additionally, because the coating 504 is thin, the likelihood of localized tearing is significantly reduced.

The word "printer" or "image output terminal" as used herein encompasses any apparatus, such as a digital copier, bookmaking machine, facsimile machine, multi-function machine, etc., which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A method comprising:

feeding a continuous core of a print cartridge cleaning blade along a path, said path passing, in the following order, firstly through a coating bath, secondly by a curing station, thirdly through a cutter, and fourthly to a finisher station, said core being selected to comprise a rectangular shape having a top, a bottom, sides, and ends, said core comprising square corners located where said sides of said rectangular shape meet said top and said bottom, said rectangular shape having a length greater in size than a thickness and a height, said height being greater in size than said thickness, said top and said bottom being rectangular planes defined by said thickness and said length, said sides being rectangular planes defined by said height and said length, and said ends being rectangular planes defined by said height and said thickness;

coating portions of said continuous core that are in said coating bath with an outer covering, said outer covering consisting of polymer materials, said outer covering being selected to form four square blade edges where said outer covering covers said square corners, and an elastic modulus or said core being at least five times that or said outer covering;

for portions of said continuous core that are adjacent said curing station, curing said outer covering of said continuous core;

for portions of said continuous core that are in said cutter, cutting said continuous core into lengths; and for portions of said lengths of said continuous core that are adjacent said finishing station, finishing said outer covering of said predetermined lengths of said continuous core to produce a finished print cartridge cleaning blade, said four square blade edges comprising four distinct blade edges that contact surfaces being cleaned permitting said finished print cartridge cleaning blade to be flipped or rotated to utilize a new blade edge.

2. The method according to claim 1, said coating further comprising applying an electrical charge to said coating bath and said continuous core.

3. The method according to claim 1, said curing comprising at least one of:

evaporating moisture and solvents from said coating;

applying heat to said coating; and applying ultra-violet light to said coating.

4. A method comprising:

feeding a continuous core of a print cartridge cleaning blade along a path, said path passing, in the following order, firstly through a spray coating station, secondly by a curing station, thirdly through a cutter, and fourthly to a finisher station, said core being selected to comprise a rectangular shape having a top, a bottom, sides, and ends, said core comprising square corners located where said sides of said rectangular shape meet said top and said bottom, said rectangular shape having a length greater in size than a thickness and a height, said height being greater in size than said thickness, said top and said bottom being rectangular planes defined by said thickness and said length, said sides being rectangular planes defined by said height and said length, and said ends being rectangular planes defined by said height and said thickness;

coating portions of said continuous core that are in said spray coating station with as outer covering, said outer covering consisting of polymer materials, said outer covering being selected to form four square blade edges where said outer covering covers said square corners, and an elastic modulus of said core being at least five times that of said outer covering;

for portions of said continuous core that are adjacent said curing station, curing said outer covering of said continuous core;

for portions of said continuous core that are in said cutter, cutting said continuous core into lengths; and for portions of said predetermined lengths of said continuous core that are adjacent said finishing station, finishing said outer covering of said predetermined lengths of said continuous core to produce a finished print cartridge cleaning blade, said four square blade edges comprising four distinct blade edges that contact surfaces being cleaned permitting said finished print cartridge cleaning blade to be flipped or rotated to utilize a new blade edge.

5. The method according to claim 4, said coating further comprising applying an electrical charge to said spray coating station and said continuous core.

6. The method according to claim 4, said curing comprising at least one of:

evaporating moisture and solvents from said coating;

applying heat to said coating; and applying ultra-violet light to said coating.

7. A method comprising:

simultaneously feeding a plurality of continuous cores of a print cartridge cleaning blade along a path, said path passing, in the following order, firstly through a coating bath, secondly by a curing station, thirdly through a cutter, and fourthly to a finisher station, each of said continuous cores being selected to comprise a rectangular shape having a top, a bottom, sides, and ends, each of said cores comprising square corners located where said sides of said rectangular shape meet said top and said bottom, said rectangular shape having a length greater in size than a thickness and a height, said height being greater in size than said thickness, said top and said bottom being rectangular planes defined by said thickness and said length, said sides being rectangular planes defined by said height and said length, and said ends being rectangular planes defined by said height and said thickness;

coating portions of said continuous cores that are in said coating bath with an outer covering, said outer covering consisting of polymer materials, said outer covering being selected to form four square blade edges where said outer covering covers said four square corners, and an elastic modulus of said core being at least five times that of said outer covering;

for portions of said continuous cores that are adjacent said curing station, curing said outer covering of said continuous cores;

for portions of said continuous cores that are in said cutter, cutting said continuous cores into lengths, and for portions of said lengths of said continuous cores that are adjacent said finishing station, finishing said outer covering of said lengths of said continuous cores to produce a finished print cartridge cleaning blade, said four square blade edges comprising four distinct blade edges that contact surfaces being cleaned permitting said finished print cartridge cleaning blade to be flipped or rotated to utilize a new blade edge.

8. The method according to claim 7, said coating further comprising applying an electrical charge to said coating bath and said continuous cores.

9. The method according to claim 7, said curing comprising at least one of:

evaporating moisture and solvents from said coating;

applying heat to said coating; and applying ultra-violet light to said coating.

* * * * *